United States Patent [19]

Leonard

[11] Patent Number: 4,779,512
[45] Date of Patent: Oct. 25, 1988

[54] ROTARY DRIVE SPOOL VALVE

[76] Inventor: Willie B. Leonard, 5902 Royalton, Houston, Tex. 77036

[21] Appl. No.: 37,734

[22] Filed: Apr. 13, 1987

[51] Int. Cl.$^4$ .............................................. F15B 9/10
[52] U.S. Cl. .................................. 91/375 R; 91/378; 91/380; 137/625.69
[58] Field of Search ................... 91/358 R, 368, 374, 91/375 R, 376 R, 377, 378, 380; 137/625.69, 625.65

[56] References Cited

U.S. PATENT DOCUMENTS 2,960,071 11/1960 Rosebrook ..................... 91/380 X
3,310,284 3/1967 Inaba et al. ..................... 91/380 X
3,530,764 9/1970 Tomita ........................... 91/380 X
3,721,266 3/1973 Ikebe et al. ..................... 137/625.69

FOREIGN PATENT DOCUMENTS 635237 4/1950 United Kingdom ........... 137/625.69

Primary Examiner—Edward K. Look
Attorney, Agent, or Firm—David A. Rose

[57] ABSTRACT

A rotary drive fourway spool valve with rotary feedback includes a spool and a seat sleeve both rotatable within and the spool axially slidable in the valve body and connected by a straight screw thrust. Belleville springs center the sleeve azimuthically relative to the spool.

22 Claims, 3 Drawing Sheets

ROTARY DRIVE SPOOL VALVE

SUMMARY OF THE INVENTION

This invention relates to a spool valve actuated mechanically by a rotary input and and provided with a rotary feedback.

According to the invention, a fourway spool valve is provided with a seat bushing or sleeve which is rotatable within the valve body. The valve spool and seat sleeve are interconnected by lead screw means whereby either one can be rotated by the input and the other by the feedback to move the spool and sleeve relative to each other to control fluid flow.

According to a modification, a spring return mechanism centers the spool angularly to prevent accidental excessive fluid flow upon restarting after the apparatus has been shut down for awhile. Absent such centering mechanism, such shut down would allow one valve member, e.g. sleeve, to rotate without rotative feedback to the other valve member, e.g. the spool, since there is no movement of the power cylinder; thereafter restarting the system with the valve wide open will cause an unexpected large movement of the power cylinder controlled by the spool valve.

The drawings are to scale. The conventions of the United States Patent and Trademark Office for indication of materials on patent drawings have been followed, from which it will be seen that the valve is primarily made of metal, e.g. steel, except for seals, which may be made of rubber.

DETAILED DESCRIPTION OF THE PREFERRED EMBODIMENT

Body

Figure 1:
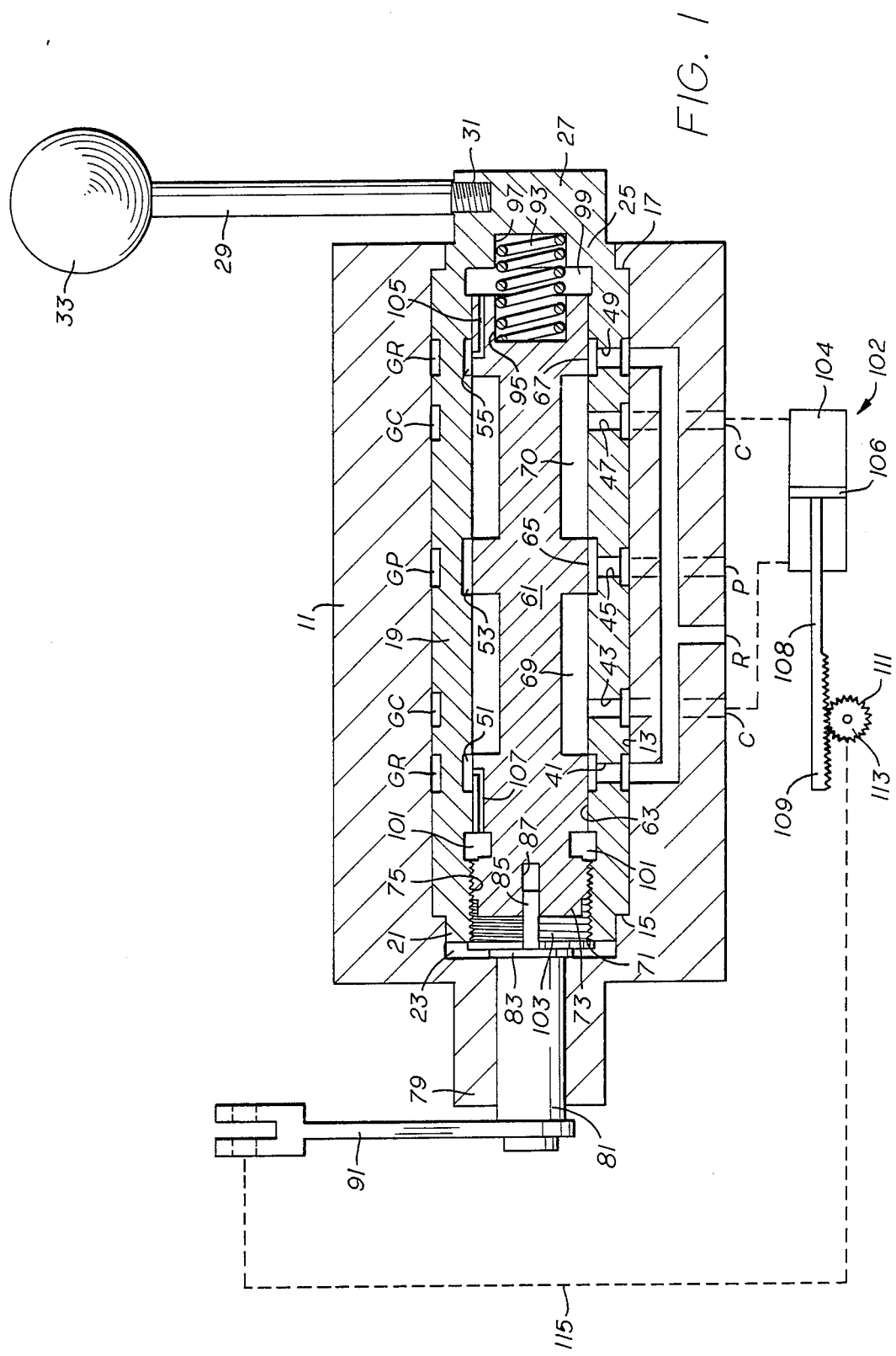
FIG. 1 is an axial section through a spool valve incorporating the invention.

Referring to FIG. 1 there is shown a fourway valve comprising a body 11 having a generally cylindrical bore 13. Radial passages C, R, P, C are provided for connection respectively to: a source of actuating fluid (e.g. hydraulic oil) supplied under pressure (P), a reservoir (R) at lower pressure (e.g. atmospheric) and (C,C) to, e.g. the opposite ends of a hydraulic cylinder or other device to be actuated. Radial passage R is branched, dividing into two flow passages in the interior of the body. The axial connection between the branches is made by an axial bore extending through one end of the body, which is subsequently plugged.

The body is shown as integral, for simplicity, but actually will be split, e.g. transversely at one end, into two parts to be bolted together, thereby to allow assembly of the rest of the valve within the body between inturned shoulders 15, 17 at the ends of the body.

Seat Sleeve

Rotatably disposed within bore 13 and captured axially between shoulders 15, 17, is a seat sleeve 19. The sleeve has circumferential grooves GR, GC, GP, GC, GR in register with the inner ends of flow passages R, C, P, C, R.

The distal end 21 of the sleeve 19 has a portion of smaller outer diameter than the adjacent part of the sleeve and extends past shoulder 15 into socket 23 in one end of the valve body. The proximal end 25 of the sleeve 19 has a portion of smaller outer diameter than the adjacent portion of the spool, such portion extending past shoulder 17 to outside of the body, whereat the end of the sleeve is closed forming a hub 27. A lever 29 is screwed into the hub at 31 and extends radially from the hub to a handle or knob 33. The fit of sleeve 19 within bore 13 is tight enough to minimize leakage therebetween, but O-rings or other seals may be employed therebetween if desired, to isolate the various grooves G (GR, GC, GP, GC, GR), one from another. There is enough friction between the sleeve and the body to retain the sleeve in whatever angular position it is set by lever 29.

Each of the circumferential grooves G connects with one of radial passages 41, 43, 45, 47, 49. Passages 41, 45, 49 connect with internal radial grooves 51, 53, 55, in the generally cylindrical inner periphery 57 of the sleeve 19. The edges of grooves 51, 53, 55 and the adjacent areas of the inner periphery of the sleeve may be said to be the valve seats. When grooves 51, 53, 55 are blocked there is no flow in from the pump at P and no flow out to the reservoir at R.

Spool

Rotatably and axially slidably mounted within the inner periphery of seat sleeve 19 is spool 61 having circumferential flanges forming cylindrical lands 63, 65, 67. These lands constitute valve closures which cooperate with the valve seats in the seat sleeve, blocking flow therethrough or permitting flow according to their relative axial position. The annular spaces or grooves 69, 70 form internal flow passages of the valve for communicating the controlled flow passages C with the reservoir and pressure fluid flow passages R, P according to the axial position of the spool relative to the sleeve.

Spool Drive

The distal end 21 of seat sleeve 19, opposite from hub 27, is open and is provided internally with a lead screw or straight (untapered) thread 71. A head 73 on the adjacent end of spool 61 is provided with a straight thread 75 correlative to thread 71. By means of threads 71, 75, rotary motion of either the sleeve or spool is converted to axial movement of the spool.

The end of the valve body 11 adjacent spool head 73 is open and is provided with a tube or neck forming a bearing 79 receiving a shaft 81 rotatable therein. Shaft 81 makes a close fit within bearing 79 so as to minimize fluid flow therefrom, but a seal such as an O-ring can be employed therebetween if desired. The end of shaft 81 within body 11 is provided with a circumferential flange 83 forming a thrust bearing preventing the shaft from being blown out of the valve body. A non-circular cross-section pin 85 extends inwardly from flange 83 into a correlative socket 87 in the adjacent end of the spool. Pin 85 is axially slidable within socket 87. Pin 85 and socket 87 provide spline means for transmitting rotation of shaft 81 to spool 61 while allowing relative axial motion therebetween.

A lever 91 is fastened to the outer end of shaft 81 and is adapted for connection to a mechanism positioned by the valve to provide mechanical feedback to the valve.

A helical spring 93 is disposed coaxial with spool 61 between a socket 95 in the end of the spool adjacent hub 27 and a socket 97 in hub 27. Spring 93 biases the spool away from the hub and takes up any play between threads 71, 75.

To prevent hydraulic locking or pressure imbalance, the spaces 99 and 101—103 occupied by spring 93 and head 73, respectively, are vented to reservoir, by passages 105, 107 respectively. See U.S. Pat. No. 4,623,003 to Leonard and the references cited therein.

Operation

When lever 29 is displaced in either direction, clockwise or counterclockwise, sleeve 19 is turned a like amount, rotating lead screw 71 at the distal end of the sleeve. Friction might tend to cause thread 75 on the adjacent end of the spool to turn too, but rotation of the spool is prevented by pin 85 which is held stationary as long as feedback lever 91 does not turn. The result is that relative rotation of sleeve thread 71 and spool thread 75 drives the spool axially in one direction or the other according to the direction of relative rotation the threads.

Axial motion of the spool from the position shown causes valve closure flange 65 to move away from its position over groove 53 and allows pressure fluid to flow axially of the spool to the adjacent one of sleeve ports 43, 47 and thence via the corresponding one of ports C to one side of the device to be actuated, e.g. a hydraulic motor shown schematically at 102. The motor may include a cylinder 104 and a piston 106, the latter having a piston rod 108 connected thereto extending out one of the cylinders in axially slidable sealed relationship thereto. Meanwhile fluid at the other side of the motor (opposite side of the piston) exhausts through the other flow passage C and axially through the valve to the adjacent reservoir port groove 63 or 67.

The resulting motion of the piston rod 108 drives some rotary device, e.g. by a rack 109 and pinion 111, the latter turning shaft 113. Shaft 113, in addition to doing whatever work is desired, is connected, as indicated at 115, so as to turn feedback lever 91. Rotary displacement of lever 91 turns pin 85 which causes spool 61 to rotate. Rotation of the spool causes it to move axially back toward its original position because of the engagement of spool thread 75 with sleeve thread 71. The spool will be driven back until flange 65 cuts off pressure fluid groove 53 and flanges 63, 67 cut off exhaust grooves 51, 55, whereupon motion of piston 106 ceases.

It is to be noted that there are no stops limiting the turning of input lever 29 and sleeve 19. If the sleeve is turned continuously in one direction, shaft 113 will turn in synchronism with the sleeve to the limit of the travel of piston 106. If a rotary fluid motor is substituted for hydraulic cylinder 102, continuous turning of shaft 113 in response to turning of the bushing will result. It takes a certain amount of time for fluid to flow from the pump to the hydraulic motor and cause movement of piston 106 and shaft 113 and feedback lever 91; therefore there will always be an angular displacement between the spool and sleeve sufficient to keep the valve open and continue the motion of the motor 102.

Valve Response

The flanges or valve closures 63, 65, 67 are shown as having the same width as pressure fluid inlet grooves or valve seats 51, 53, 55, so that the slightest rotation of the input lever 29 and sleeve 19 starts the opening of the valve. If desired, the flanges can be made wider than the valve seat groove so that there is an overlap; then initial motion of the input lever will have no valve opening effect; the device will be less sensitive.

The lead screw 71 and cooperating thread 75 preferably are provided with a steep pitch (and preferably made of multiple threads) so that only a small angular movement of the input lever 29 and sleeve will be required to open the valve fully once opening commences. This causes a fast response of the controlled device 102, 113 to an input motion of lever 23, enabling the device 102, 113 to follow closely the motion of the input lever 29. Stops (not shown) may be provided to limit travel of lever 29. Such stops define the range of motion. The response may be said to be non linear, in that the initial opening of the valve is proportional to sleeve rotation relative to the spool rotation, but thereafter further angular motion of the sleeve rotation relative to the spool within the limits of motion effects only a slight further opening of the valve, such further opening corresponding to widening of the uncovered part of the flow passage grooves to a greater area than the cross-section of the connecting radial passages 41, 45, 49.

Second Embodiment

Figure 2:
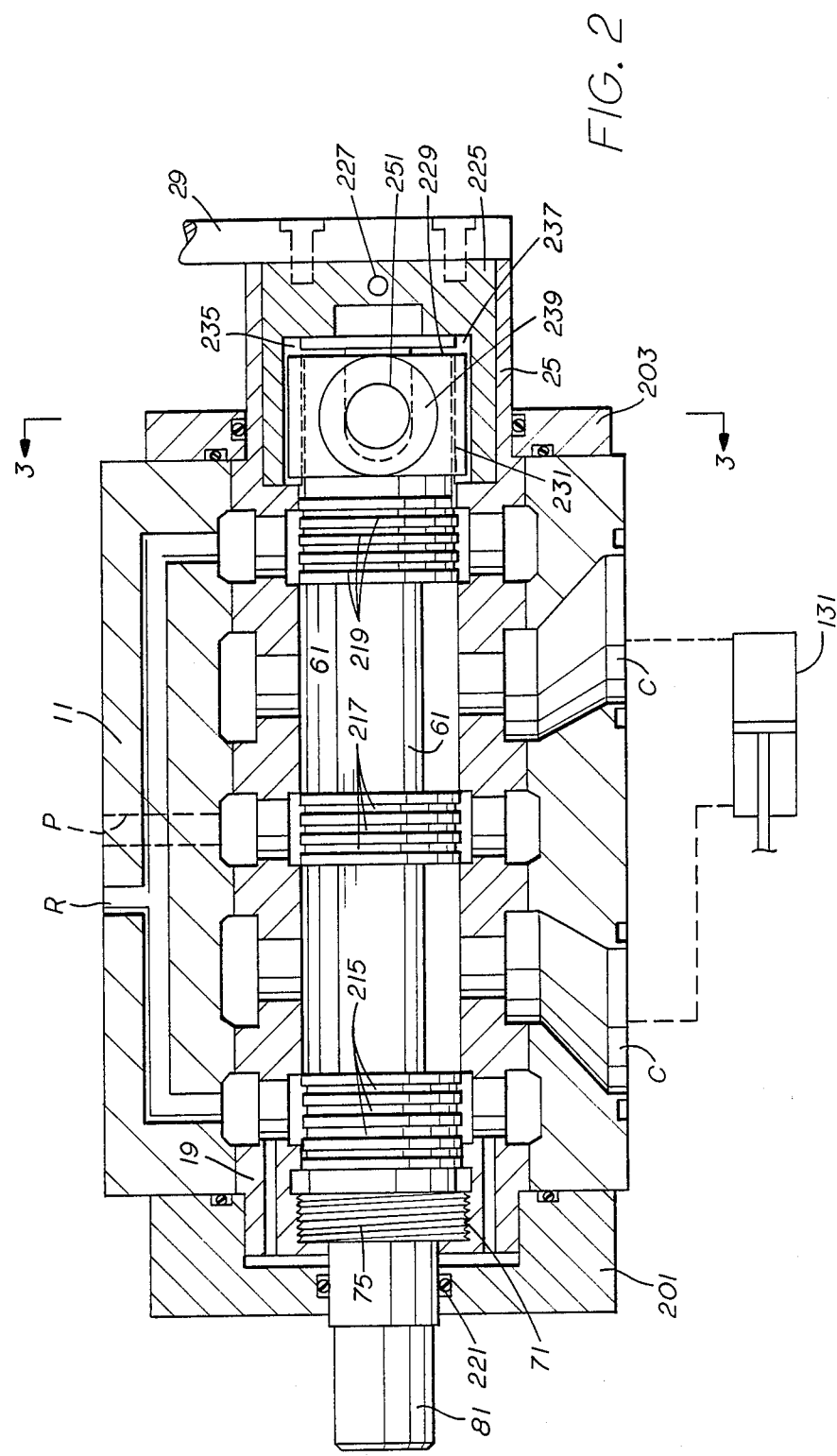
FIG. 2 is a view similar to FIG. 1 showing a further embodiment of the invention.

Referring now to FIG. 2 there is shown a valve similar to that of FIG. 1. Like parts are given like numbers to avoid repetition of description. The drawing is less schematic and shows end caps 201, 203 affixed to the ends of valve body 11, e.g. by means of screws, not shown, and are sealed by O-rings as shown. The valve closure flanges are provided with multiple annular grooves 215, 217, 219 to equalize fluid pressure around the spool and prevent thrust and consequent sticking. The feedback shaft 81 is sealed to end cap 201 by Quad ring 221. The splined connection between feedback shaft 81 and spool 61 is omitted, so that axial movement of the shaft occurs in response to relative rotation between the sleeve threads 71 and spool threads 75. No slack take up spring (such as 93 of FIG. 1) is employed.

The proximal end 25 of seal sleeve 19 receives a cup shaped spring cage 225 which is secured thereto by a roll pin 227. The adjacent end of the spool is provided with a blade 229 (see also FIGS. 3 and 4). Rectangular pressure plates or washers 231, 233 at each side of the blades engage horizontal ribs 235, 237 inside cage 225, being pressed against the ribs by the adjacent ends of stacks 239, 241 of Belleville springs, the opposite ends of the spring stacks bearing against spring seats 243, 245 in the cage. The spring seats are formed by the bottoms of cylindrical spring sockets 247, 249.

A spring guide pin 251 extends transversely across cage 225, its ends being supported and, e.g. press fitted, in bores 252, 253. The Belleville spring stacks are slidably spindled on pin 251. The mid portion 255 of the guide pin is of smaller diameter than the end portions and extends freely through slot 257 in the blade 229. Plates 231, 233 are provided with large apertures 259, 261 through which the guide pin extends freely without interference.

If the input lever 29 is turned it carries with it not only sleeve 19 but cage 225. Rotation of the cage causes plates 231, 232 to engage blade 229 (see FIG. 4) and further turning of the cage will cause the plates to be displaced away from the ribs 235, 237. When the spool rotates in response to turning of feedback shaft 81, as described in connection with FIG. 1, the plates and blades will be returned to the FIG. 3 position. The springs therefor do not interfere with the normal operation of the apparatus as described with reference to FIG. 1.

Figure 4:
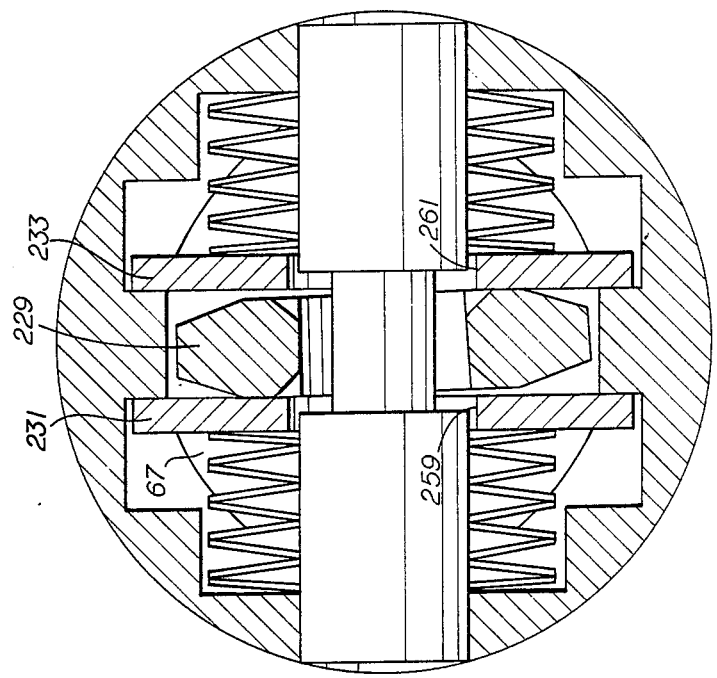
FIG. 4 is a view similar to FIG. 3 showing the spool slightly rotated, but within the deadband wherein the centering mechanism is still inactive.
Figure 3:
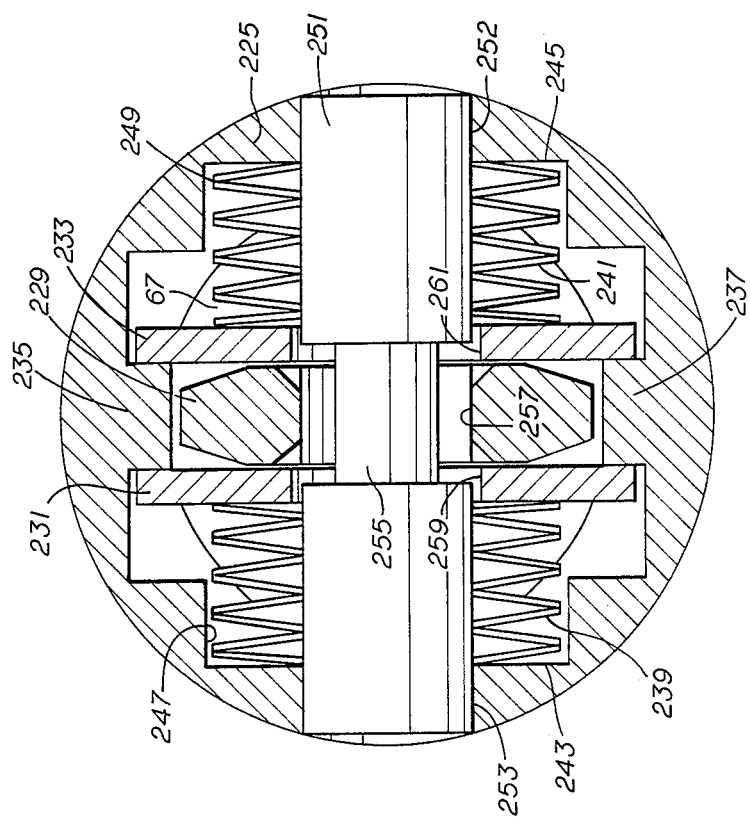
FIG. 3 is a section on plane 3—3 of FIG. 2.

However, e.g. if the apparatus is shut down, the input lever 29 cannot be accidentally displaced a large amount relative to feedback shaft 81, for the spring centering means 239, 241 just described will maintain them in a centered relative position as shown in FIGS. 3 or a near-to-centered position as shown in FIG. 4. Therefore no sudden displacement will be imparted to motor 131 when the apparatus is restarted, as might otherwise occur, e.g. if there were no centering means.

The modifications of FIG. 2 can be incorporated in the FIG. 1 valve and vice versa.

While a preferred embodiment of the invention has been shown and described, other embodiments and modifications can be made without departing from the spirit of the invention.

I claim:

1. A spool valve including a hollow body having inlet and outlet means and having means for controlling flow from the inlet means to the outlet means comprising a ported seat sleeve rotatably mounted in the body and a port closure spool rotatably and axially slidably mounted in the sleeve, screw thread means interconnecting the spool and sleeve to cause axial movement of the spool relative to the sleeve in response to relative rotational displacement of the spool and sleeve, and actuator means connected to one end of the spool and extending through the adjacent end of the body adapted for connection between the spool and said actuator means including a spline to allow relative axial motion of said actuator means and spool, said actuator means including a shaft and shaft thrust bearing means between the shaft and body to prevent relative axial travel, said spline means comprising a non-circular rod extending axially from said shaft means into a noncircular socket in the adjacent end of the spool.

2. Valve according to claim 1 including resilient means urging said spool and sleeve to a predetermined relative angular locale with respect to the axis of the screw thread means.

3. A spool valve including a hollow body having inlet and outlet means and having means for controlling flow from the inlet means to the outlet means comprising a ported seat sleeve rotatably mounted in the body and a port closure spool rotatably and axially slidably mounted in the sleeve, screw thread means interconnecting the spool and sleeve to cause axial movement of the spool relative to the sleeve in response to relative rotational displacement of the spool and sleeve, and resilient means urging said spool and sleeve to a predetermined relative angular locale with respect to the axis of the screw thread means.

4. Valve according to claim 3 including means connected to one end of the sleeve extending outside the body at one end thereof and adapted for connection to rotational drive means and means connected to the end of said spool extending outside the body at an opposite end and adapted for connection to another rotational drive means.

5. Valve according to claim 3 including closure means extending from one end of the sleeve over the adjacent end of the spool and closing the adjacent end of the valve.

6. Valve according to claim 5 including spring means acting between said closure means and said adjacent end of the spool biasing said spool and sleeve axially to take up play in said thread means.

7. Valve according to claim 6, said closure means including connection to actuator means for turning the sleeve, the other end of said spool being connected by spline means to shaft means extending outside the other end of the body adapted for connection to actuator means for driving the spool.

8. Valve according to claim 3 including actuator means connected to one end of the spool and extending through the adjacent end of the body adapted for connection to rotary drive means for turning the spool, the connection between the spool and said actuator means including a spline to allow relative axial motion of said actuator means and spool.

9. Valve according to claim 8, said actuator means including a shaft and shaft thrust bearing means between the shaft and body to prevent relative axial travel, said spline means comprising a non-circular rod extending axially from said shaft means into a noncircular socket in the adjacent end of the spool.

10. Valve means according to claim 3, said resilient means including spring engaging means on one end of said spool, spring support means carried by the adjacent end of the sleeve, and spring means between said engaging and support means.

11. Valve according to claim 10, said spring engaging means comprising a blade and said spring means comprising a Belleville spring stack at each side of said blade.

12. Valve according to claim 11, said spring support means including a cap at the end of the spool around the blade and connected to the adjacent end of the spool, rib means extending inside the cap parallel to the axis of the spool and sleeve and thread means, and thrust plate means engaging between the rib means and Belleville spring stacks to limit extension of the stacks while allowing turning of the blade to contract the spring stacks.

13. Valve according to claim 12 including a guide pin extending laterally across said cap through said spring stacks and through apertures in said plates and through an opening in the end of said blade.

14. Valve according to claim 13 wherein the width of the blade is less than the width of the rib means allowing a certain amount of turning of the spool without contraction of the spring stacks.

15. Valve according to claim 13 wherein the blade is of varying thickness, being thickest medially and thinner nearer to the axis of the spool and thinner further out closer to the periphery of the spool to allow more turning of the spool relative to the sleeve before the resilient means comes into action to resiliently oppose farther relative turning of the spool and sleeve; and to the same end said guide pin being of reduced diameter where it passes through the blade and said blade being of less height than the distance between said rib means.

16. Valve according to claim 3 including a shaft rigidly connected to one end of said spool and extending axially slidably and rotatably through the adjacent end of said body and a sliding seal means sealing the shaft to said body, said shaft being adapted on its part outside said body for connection to actuation rotary drive means for turning the spool.

17. Valve according to claim 16, the other end of said spool being provided with torque transmitting means for turning the spool, said valve further including reaction means extending from said spool around said torque transmitting means, and spring means between said torque transmitting means and reaction means for resiliently positioning said spool and sleeve relative to each other.

18. Valve according to claim 17, said reaction means including a spring cage which extends from said spool out through the adjacent end of the valve body which houses said spring means, and means around said spring cage adapted to engage rotary drive means for turning said spool.

19. Valve according to claim 3, said valve being a fourway valve having inlet, outlet, and two flow ports in said body and said sleeve which ports are controlled by flanges on said spool, whereby when said flow ports are connected to a driven device one of said rotational drive means can be used to open the valve to move the device and the other can be connected to such device to provide position feedback to said valve to reclose same when the device has been positioned as desired and directed by said one rotational drive means.

20. Valve according to claim 3 including stop means limiting rotation of one of said sleeve and spool to a predetermined range, said screw thread means having multiple threads on each of said sleeve and spool and having a pitch sufficient to move the closure relative to the seal to widely open the ports in the seal upon rotation of said one of said seat and sleeve through an angle that is less than 15 degrees and less than 50% of said range of rotation, said ports when widely open providing a flow area therethrough as great as that of said inlet and outlet means, further rotation of said one of said seat and sleeves further enlarging said flow area through said ports.

21. A spool valve including a hollow body having inlet and outlet means and having means for controlling flow from the inlet means to the outlet means comprising a ported seat sleeve rotatably mounted in the body and a port closure spool rotatably and axially slidably mounted in the sleeve, screw thread means interconnecting the spool and sleeve to cause axial movement of the spool relative to the sleeve in response to relative rotational displacement of the spool and sleeve, a shaft rigidly connected to one end of said spool and extending axially slidably and rotatably through the adjacent end of said body and a sliding seal means sealing the shaft to said body, said shaft being adapted on its part outside said body for connection to actuation rotary drive means for turning the spool, the other end of said spool being provided with torque transmitting means for turning the spool, said valve further including reaction means extending from said spool around said torque transmitting means, and spring means between said torque transmitting means and reaction means for resiliently positioning said spool and sleeve relative to each other.

22. A spool valve including a hollow body having inlet and outlet means and having means for controlling flow from the inlet means to the outlet means comprising a ported seat sleeve rotatably mounted in the body and a port closure spool rotatably and axially slidably mounted in the sleeve, screw thread means interconnecting the spool and sleeve to cause axial movement of the spool relative to the sleeve in response to relative rotational displacement of the spool and sleeve, stop means limiting rotation of one of said sleeve and spool to a predetermined range, said screw thread means having multiple threads on each of said sleeve and spool and having a pitch sufficient to move the closure relative to the seal to widely open the ports in the seal upon rotation of said one of said seat and sleeve through an angle that is less than 15 degrees and less than 50% of said range of rotation, said ports when widely open providing a flow area therethrough as great as that of said inlet and outlet means, further rotation of said one of said seat and sleeves further enlarging said flow area through said ports.

* * * * *